(No Model.) 2 Sheets—Sheet 1.

J. THOMSON.
MULTIPLE PROPORTIONAL METER.

No. 485,439. Patented Nov. 1, 1892.

Witnesses
Jno. G. Hinkel
Alex N. Dobson

John Thomson
Inventor
By
Foster & Freeman
Attorneys (No Model.) 2 Sheets—Sheet 2.

J. THOMSON.
MULTIPLE PROPORTIONAL METER.

No. 485,439. Patented Nov. 1, 1892.

Witnesses
Jno. G. Hinkel
Alex N. Dobson

John Thomson
Inventor
By Forster & Freeman
Attorneys

UNITED STATES PATENT OFFICE.

JOHN THOMSON, OF BROOKLYN, NEW YORK, ASSIGNOR TO THE THOMSON HYDRAULIC COMPANY, OF NEWARK, NEW JERSEY.

MULTIPLE PROPORTIONAL METER.

SPECIFICATION forming part of Letters Patent No. 485,439, dated November 1, 1892.

Application filed July 16, 1892. Serial No. 440,244. (No model.)

*To all whom it may concern:*

Be it known that I, JOHN THOMSON, a citizen of the United States, residing at Brooklyn, Kings county, New York State, have invented certain new and useful Improvements in Multiple Proportional Meters, of which the following is a specification.

This is an invention in multiple proportional meters, the particular objects thereof being to reduce the ratio of the measured to the inferred volume and to insure an approximately-accurate indication of the quantity delivered even should portions of the apparatus become inoperative. These objects are accomplished by providing a plurality of measuring mechanisms, all of which are connected to a single proportional valve device.

Figure 1:
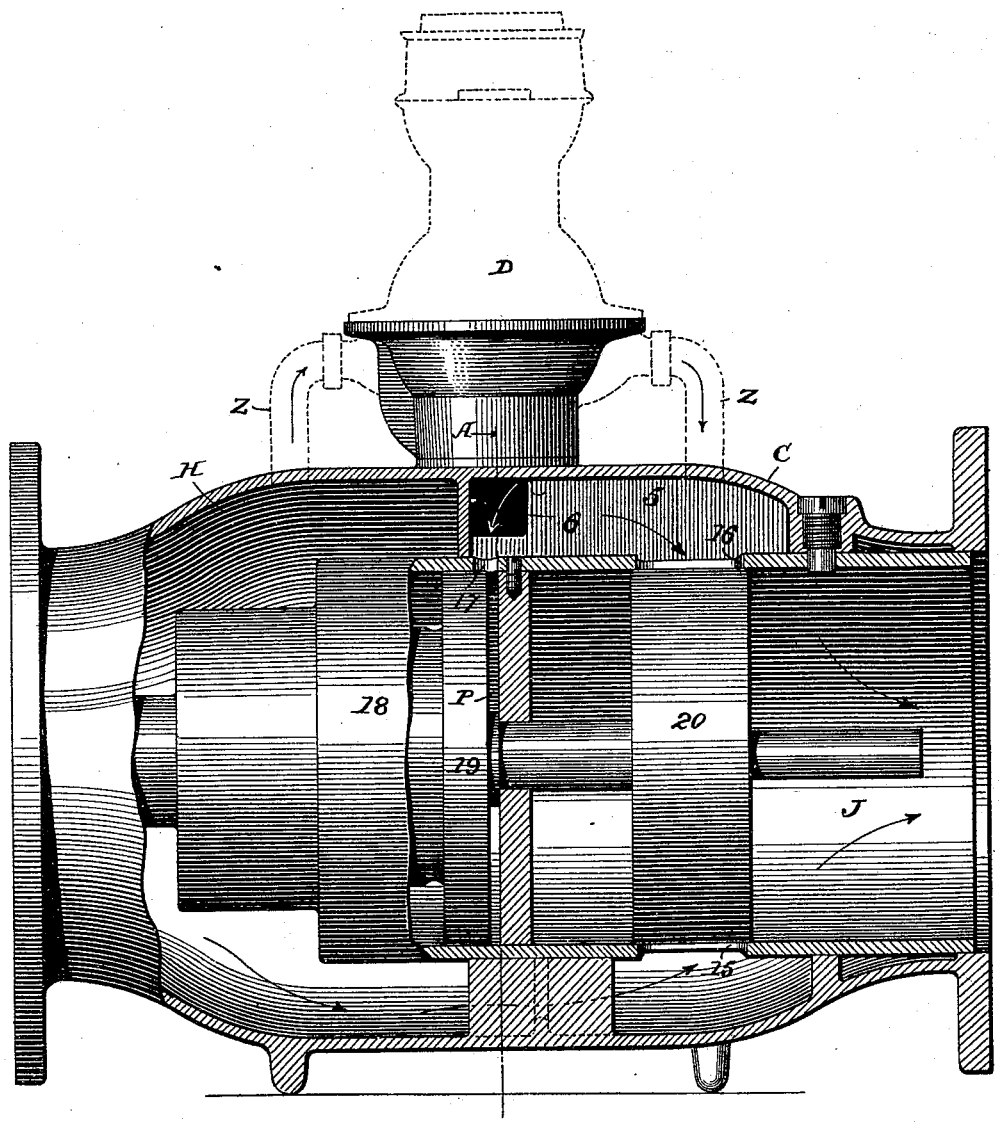
Figure 2:
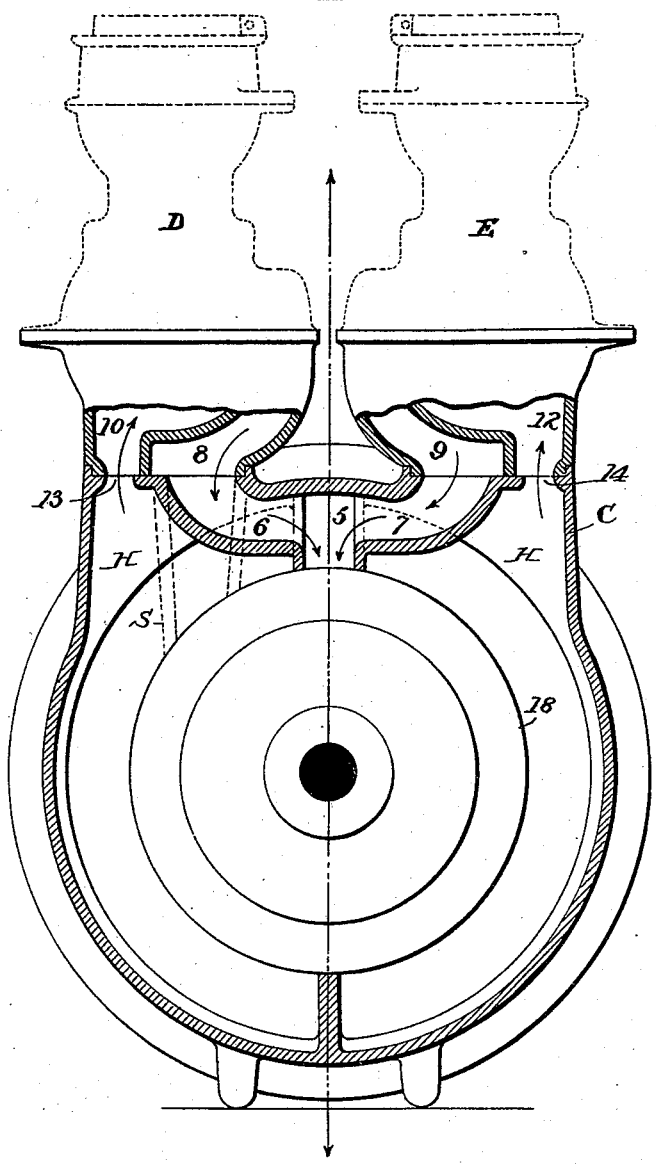

In the drawings, Figure 1 is a part-vertical center section and elevation, and Fig. 2 is a part end elevation and transverse section on line A.

The valve device here illustrated is similar to that described in my patent of May 31, 1892, No. 476,103. Therefore full description of its details is not regarded necessary to this specification, except only in its present relation.

The controlling-chamber 5, contained in the main casing C, connects with the discharge-channels of a number of separate or independent measuring mechanisms. Thus it is provided with two separate channels 6 7, each leading outward thereto and connecting with the discharging-channels 8 9 of the separate measuring mechanisms D E. The inlet-chambers 10 12 of the two measuring mechanisms are both directly connected, as by the ports 13 14, to the inlet-chamber H of the main casing. J is the outlet-chamber.

15 is one of the series of radial valve-casing ports, which discharges the main volume; 16, the port, which discharges the measured aliquot part, and 17 is the duct, which places the controlling-chamber 5 and the channels in communication with the positive chamber P of the valve-casing 18, in which is the piston 19, that serves to move the valve 20 to and fro. By thus subdividing the measured volume and registering the quantity in each subdivision and causing a plurality of measuring mechanisms to discharge into one chamber and through one port any variation in the resistance of any or all of such measuring mechanisms will result in a proper coaction of the valve device exactly as in the instance of using but a single volume and one measuring mechanism, as is fully set forth in the patent cited. The principal advantages derived from this division of the measured volume are that a single standard minimum size of measuring mechanism may be employed for any capacity of conduit; that the consequent reduction of the ratio increases the sensibility of the meter at low rates of flow, and that in event of the failure of one measuring mechanism to register properly the other or others will still denote the quantity with approximate accuracy. In standardizing the registers each may be arranged, as preferred, either to indicate the total quantity or the proportional allotment actually delivered.

In dotted lines S, Fig. 2, is indicated a modification whereby the discharging-channels 6 7 may be separately conducted to connect with the positive chamber P and to discharge through separate ports in the valve-casing. By this arrangement, however, the proportional ratio would not be reduced; but each measuring mechanism would simply act as a check on the other. Still there are circumstances in practice in which this arrangement would be the more preferable of the two.

As shown in the drawings, the practical construction of the apparatus, to accomplish any of the conditions herein contemplated, is quite simple, involving but trifling additional expense over the adaptation necessary for a single measuring mechanism. Obviously, where the requirements would justify it, a "battery," so to speak, of measuring mechanisms might be used, symmetrically disposed upon or about the main casing. So, too, the measuring mechanisms may be connected to the main casing by means of pipes, as indicated in dotted outlines Z, in which instance, by means of properly-arranged stop-cocks, the measuring mechanisms might be attached or detached without disturbing the main casing. Wherefore, in view of the readiness with which detail modifications may be made by those skilled in the art, I do not limit myself to the precise construction and arrangement illustrated; but—

I claim as my invention—

1. The combination, in a proportional meter, of a plurality of measuring mechanisms, the main casing, and a controlling valve device, the inlets to the measuring mechanisms being directly connected with the inlet-chamber of the main casing, but the several discharges from the measuring mechanisms being connected with the positive chamber of said valve device, substantially as described.

2. The combination, in a proportional meter, of the proportional valve device, the controlling-chamber, and a plurality of channels leading therefrom, each of said channels being adapted to connect with the discharging end of a separate measuring mechanism, whose inlets are in connection with the inlet-chamber of the main casing, substantially as described.

3. A plurality of separate measuring mechanisms connected with the main casing of a proportional meter, the inlet of all the measuring devices being connected with the inlet-chamber of the main casing, and the outlets of all the measuring mechanisms in connection with the positive chamber of the valve device and with a discharge port or ports formed in a device for effecting the proportional control of the flow.

In testimony whereof I have signed my name to this specification in the presence of two subscribing witnesses.

JOHN THOMSON.

Witnesses:
ROBERT S. CHAPPELL,
JOHN MCKINNON.